United States Patent [19]

Paulsen

[11] 4,076,199
[45] Feb. 28, 1978

[54] CABLE SUPPORT METHOD AND APPARATUS

[76] Inventor: George T. Paulsen, 13 B Mitchell St., Norwich, N.Y. 13815

[21] Appl. No.: 702,580

[22] Filed: Jul. 6, 1976

[51] Int. Cl.$^2$ .................................................. F16L 3/22
[52] U.S. Cl. ...................... 248/68 R; 248/58; 248/60; 248/74 PB
[58] Field of Search ............. 248/68 R, 68 CB, 62, 248/67.7, 74 R, 74 PB, 70, 58, 59, 60, 49; 61/105; 138/106, 107, 112; 29/203 MW, 755, 592; 24/16 PB, 73 SA, 73 PB; 254/134.3 CL

[56] References Cited

U.S. PATENT DOCUMENTS

| | | | |
|---|---|---|---|
| Re. 22,564 | 11/1944 | Murphy | 24/73 SA |
| 1,144,593 | 6/1915 | Heiser | 248/59 |
| 1,673,813 | 6/1928 | Edelmann | 248/68 R X |
| 3,055,398 | 9/1962 | Tunnessen | 248/61 X |
| 3,197,164 | 7/1965 | Hansen | 248/74 PB X |
| 3,229,025 | 1/1966 | Barwick | 248/61 X |
| 3,300,576 | 1/1967 | Hendrix et al. | 248/61 X |
| 3,339,870 | 9/1967 | Damsgaard | 248/68 R |
| 3,471,109 | 10/1969 | Meyer | 248/68 R |
| 3,486,725 | 12/1969 | Hidassy | 248/68 R |
| 3,550,219 | 12/1970 | Van Buren | 248/74 PB |
| 3,674,233 | 7/1972 | Van Buren | 248/68 R |
| 3,848,840 | 11/1974 | Umezu | 248/74 PB X |

FOREIGN PATENT DOCUMENTS

| | | | |
|---|---|---|---|
| 249,150 | 9/1966 | Austria | 248/68 R |
| 1,480,386 | 4/1967 | France | 248/74 PB |
| 1,227,532 | 10/1966 | Germany | 24/73 SA |
| 2,226,677 | 12/1973 | Germany | 248/68 R |
| 216,520 | 10/1967 | Sweden | 248/68 R |

*Primary Examiner*—Roy D. Frazier
*Assistant Examiner*—Rodney H. Bonck
*Attorney, Agent, or Firm*—Richard G. Stephens

[57] ABSTRACT

Method and apparatus are provided for securely clamping cables in rows and columns between substantially rigid bars having a plurality of slots. Flexible plastic straps having teeth along their lengths cooperate with teeth in the slots of the bars to form ratcheting locking means which allow a strap to pass in only one direction through a slot.

17 Claims, 17 Drawing Figures

CABLE SUPPORT METHOD AND APPARATUS

My invention relates to cable or tubing support apparatus, and more particularly to economical easily-installed and reliable apparatus for supporting groups of cables, such as telephone cables in a telephone exchange, or for supporting groups of tubes, pipes, or like elongated articles. In a telephone exchange it is frequently necessary or desirable to route large groups of cables between various connection devices and various pieces of switching apparatus, and to fixedly secure the cables in place. The cables must be routed to apparatus at a variety of different locations and levels or elevations. To allow individual cables to emerge from a group to be routed conveniently to a device at a given location and elevation, it is generally necessary that such cable groups be supported on an open framework of pipes or bars or the like. Supporting cables on an open framework, as opposed to supporting them in continuous troughs or in conduits, is also desirable because it costs less to construct an open framework. Also, cables can be rerouted or additional cables can be installed, more easily, when and if rerouting or addition of cables becomes necessary, due to a change in switching equipment, for example.

Each cable typically comprises a plurality of twisted pairs of signal wires covered by plastic covering. Cables are furnished in a number of different sizes having standard numbers of twisted pairs. The diameter of a given piece of cable depends upon the number of twisted pairs it contains, and the gauge of the wire. A group of cables can consume minimum space, and can be routed more neatly if it has a generally rectangular cross-section, so it is generally desirable that a group of cables be fixed together in rows and columns, or matrix fashion. Also, tracing along a given cable is facilitated if all of the cables of a group are arranged neatly to extend in rows and columns.

Traditionally groups of cables have been arranged in matrix fashion and bound together by wrapping a length of cord, such as waxed twine or nylon cord, around the cable group at spaced intervals along the cable group, using special knots, and stitching of the cord to secure the cables together using a thin flat blade called a cable "needle". Such wrapping and stitching tends to be very time-consuming, and ordinarily can be done properly only by an experienced cable stitcher. A primary object of the invention is to provide apparatus for binding cable groups which can be installed much more rapidly than with twine or other cord, and which can be installed in a reliable and rapid manner by inexperienced workers.

It has been known that small groups of small cables can be grouped in circular bundles and bound together or tied to supporting pipes and the like using flexible plastic noose-like straps commonly called "tie-wraps". These straps include a toothed aperture on one end, through which aperture the other end of such a strap may be passed and tightened about a group of cables to bind them together. While the use of tie-wraps allows groups of cables to be rapidly bound together, it does not maintain the cables in orderly rows and columns. Furthermore, to support large assemblies of cables, tie-wrap devices would have to be supplied in very long lengths, which would be very expensive and tend to be wasteful if a standard length device had to be used for both large and small assemblies. A central concept of the present invention involves use of flexible plastic straps having efficient and reliable ratchet-type locking means of the type heretofore employed on tie-wraps, but rather than employing a toothed locking aperture on the head of a strap, I employ a plurality of such locking means in slots spaced apart along substantially rigid plastic bars, which may or may not be a part of the supporting structure. With the locking means spaced along the bars, straps of reasonable lengths can be used, together with the bars, to reliably bind even massive cable groups, and furthermore, the bars can maintain the cables of a group in orderly rows and columns.

It sometimes becomes necessary to remove or add one or more cables in a central station. Twine-wrapped cable assemblies tend to completely unravel, and to free an entire group of cables even when only one cable is to be removed or added. Another object of the invention is to provide improved cable-clamping apparatus which overcomes that problem.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings in which:

FIG. 11b is a cross-section view taken at lines 11b—11b in FIG. 11a.

Figure 1:
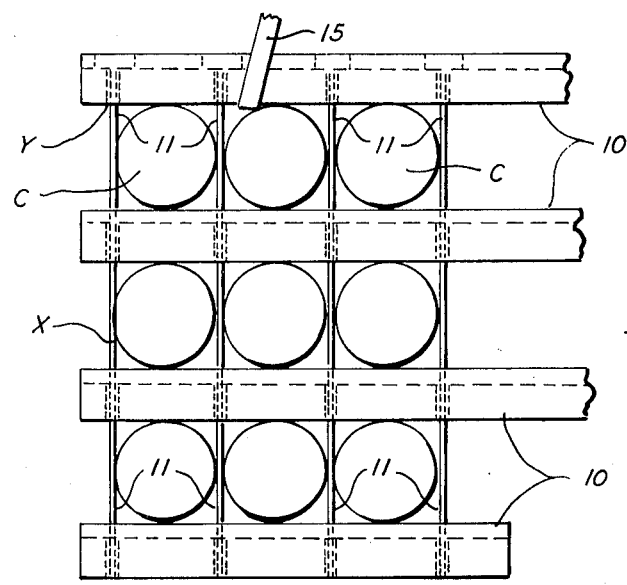
FIG. 1 is a cross-section elevation view of a group of cables shown fastened with one embodiment of the invention.
Figure 2A:
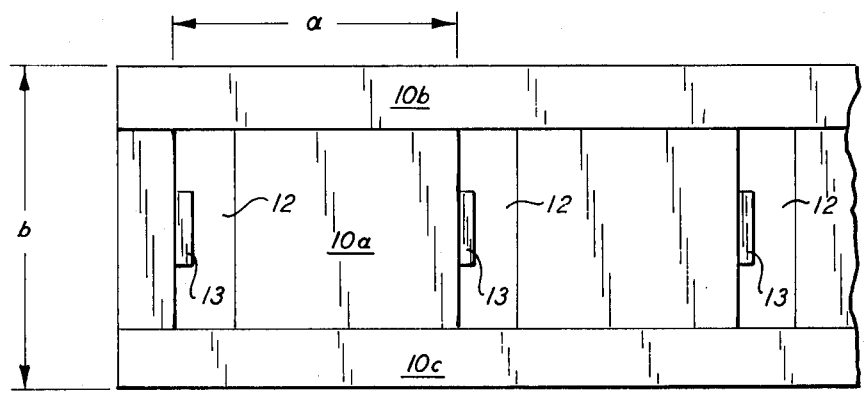
FIGS. 2a, 2b and 2c are plan, side elevation and end elevation views, respectively, of a preferred form of bar stock utilized in practicing the invention.
Figure 2C:
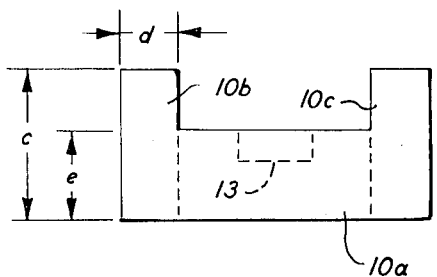

In FIG. 1, a plurality of cables C, C all shown for sake of drawing convenience as having the same diameter, are shown arranged in a matrix, or rows or columns. The cables are fastened together by means of a plurality of cross-bars 10 shown extending horizontally in FIG. 1, and a plurality of flexible plastic straps 11, with a respective cross-bar 10 being interposed between each adjacent pair of rows, and a respective strap 11 extending between each adjacent pair of columns. As seen in FIGS. 2a and 2c each cross-bar 10 comprises a generally channel-shaped member having a web portion 10a, and a pair of flange portions 10b and 10c. Each cross-bar preferably comprises a molded plastic piece, which is generally rigid, except as mentioned below. It is contemplated that bars 10 ordinarily will be formed in standard lengths, such as pieces 2 or 3 feet in length, and then cut to desired lengths as they are installed in the field in a given cable installation. However, in some embodiments of the invention, one bar of a group may form a part of, and be bolted or otherwise fastened to other portions of a pre-fabricated cable rack.

Figure 2B:
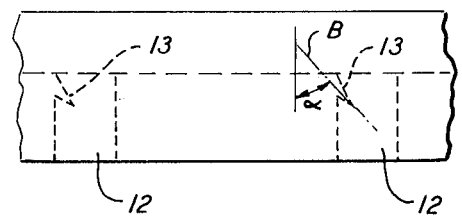

Each bar 10 will be seen to have a plurality of slots 12 spaced along and extending through its web portion 10a. Slots 12 ideally would be spaced apart (dimension a in FIG. 2a) along each bar 10 with a spacing slightly exceeding the diameter of the cables to be fastened, but in order to accommodate a variety of different cable sizes with a single type of bar, the slots are preferably spaced with an arbitrary spacing suitable to accommodate many sizes of cables, and numerous slots which may not be used are ordinarily provided. In a typical application of the invention where bar 10 has a width (dimension b in FIG. 2a) of approximately 0.33 inch, a height (dimension c in FIG. 2c) of approximately 0.16 inch, a leg width (dimension d in FIG. 2c of approximately 1/16 inch, and a web thickness (dimension e in FIG. 2c) of approximately 0.094 inch, I prefer to use a slot spacing of approximately 0.30 inch, but it is to be recognized that the dimensions suggested are not crucial to the invention. A close spacing of slots 12 along the length of the web portion of each bar 10 is useful to allow cables of many different diameters to be clamped, but it operates to decrease the bending strength of the web portion. However, the use of a channel shaped bar, having leg portions 10b, 10c, provides adequate bending strength. The edges of the leg portions also advantageously slightly bite into the cables which they engage, preventing endwise motion of the bars along the cables. In FIGS. 2a and 2c each slot 12 is shown extending the entire distance across web 10a between the inner faces of flanges 10b, 10c, but in some applications of the invention which use straps of a slightly different form than that shown in FIGS. 3 and 4 the slots 12 may have a lesser length. Each slot 12 is shown having a tooth or tongue portion 13 which partially occludes the slot. In FIGS. 2a and 2c the teeth portions 13 are shown extending less than the entire length of slots 12 for use with the straps of FIGS. 3 and 4, but when slightly different straps are used, the teeth may extend the entire length of the slots 12. As already shown in FIGS. 2b, 5a and 5b, each tooth 13 tapers or narrows from a widened root portion adjacent the side of a respective slot 12 to the thinner tip or end, and due to this varying cross-section, it will be apparent that each tooth has varying stiffness, being substantially stiffer near its root than near its tip. Each tooth may be seen to extend generally in cantilever fashion into a slot 12 from the side of the slot. Denominating a bi-sector B between the two surfaces of the tooth as the tooth axis, it will be seen that each tooth is oriented so that its axis lies at an acute angle relative to the axis of the slot 12 through the bar 10, bi-sector B being shown lying at angle α relative to the slot axis in FIG. 2b.

Figure 3:
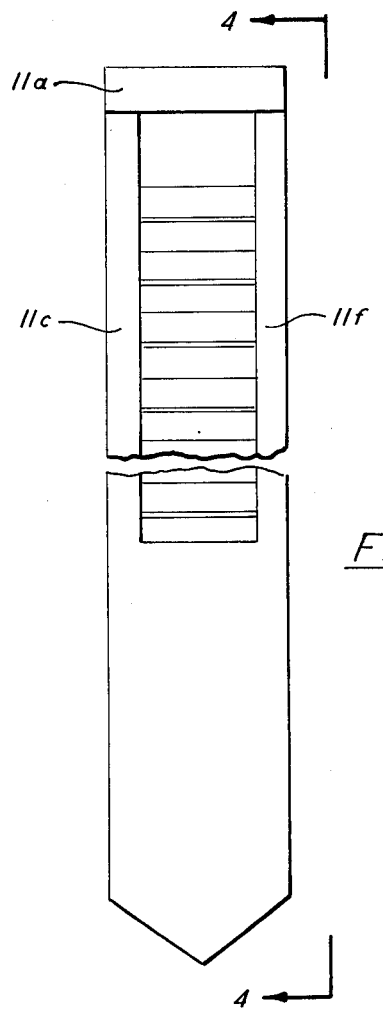
FIG. 3 is a side view of a preferred form of flexible plastic strap used in practicing the invention.
Figure 4:
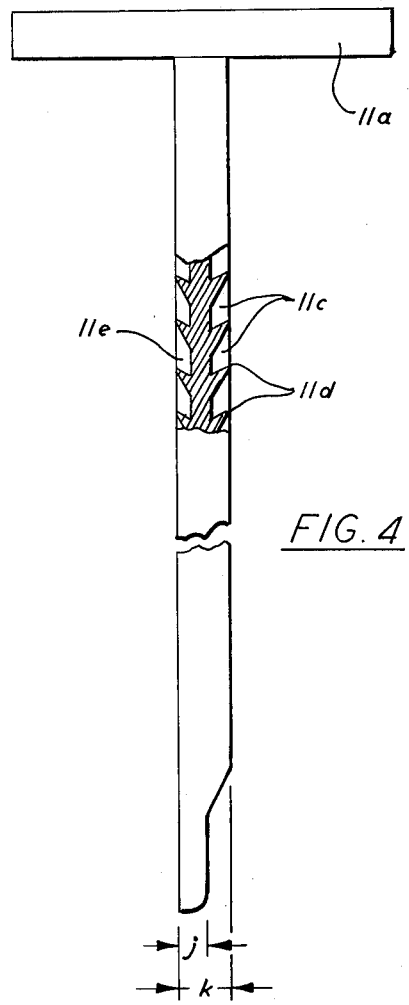
FIG. 4 is a view taken at lines 4—4 in FIG. 3.

As seen in FIGS. 3 and 4, each strap 11 includes a head portion 11a shown having a rectangular shape, and a depending length carrying a plurality of grooves or recesses 11c separated by respective tooth or land portions 11d on both sides of the strap. Each tooth portion and recess is shown extending between a pair of flat edge surfaces along one side of the strap, the surfaces being shown at 11e and 11f on one side of the strap, and with corresponding surfaces on the other side of the strap, one of which is shown at 11h in FIGS. 5a and 5b on the other side of the strap. Each tooth 11d also will be seen to taper from a thickened root portion to a narrow tip or edge, several tooth edges being labelled 15 in FIG. 5a. Since each tooth edge 15 of the strap teeth portions 11d extend between and connect to edges 11e and 11f, or edges 11g and 11h, the flexibility of teeth 11d is substantially less than that of the teeth 13 on the bars 10.

Figure 5A:
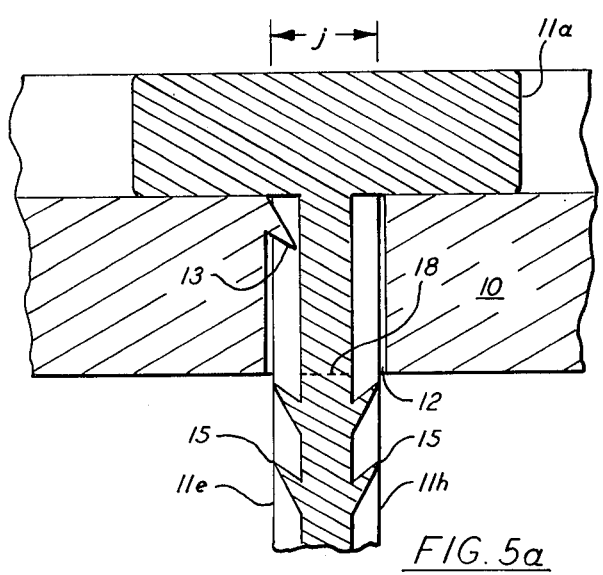
FIGS. 5a and 5b are cross-section views illustrating the strap of FIGS. 3 and 4 installed in a bar of the form shown in FIGS. 2a–2c in two different conditions.
Figure 5B:
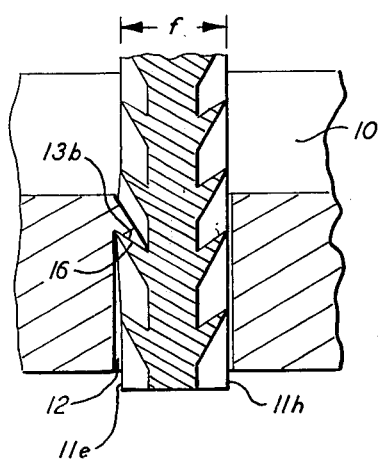

The head portion 11a of each strap need not be rectangular, and need only comprise a shape and size which will not pass through a slot 12. The widest and thickest dimensions of the portion of the strap below head 11a are made slightly less than the width and length of each slot 12, so that, in the absence of teeth 13, the strap lengths could easily be slid upwardly and downwardly through slots 12. However, due to the presence of the projecting teeth portions 13 in the slots 12, the strap lengths are movable only in the downward (in FIGS. 2b, 3, 4, 5a and 5b) direction through the slots 12 once a short length (e.g. 1 inch) at the lower end of the strap is fed through a slot 12. As shown in FIG. 4, a portion of the strap near its end is provided with a reduced thickness of dimension j. As shown in FIG. 5a, dimension j is selected to equal or be slightly less than the unoccluded width of slot 12, so that the lower end of a strap can be fed downwardly through a slot 12 without having to deflect the tooth 13. The strap then tapers to a greater thickness of dimension k, and maintains that thickness up to its head 11a, except for the recesses 11c formed on portions of its two sides. As a strap length is fed downwardly through a slot 12, successive teeth 11d on the strap then successively deflect the tooth 13 in that slot slightly downwardly. As each tooth 11d passes the tooth 13, the latter springs upwardly into the adjacent recess or groove 11c, and then is temporarily bent downwardly again by the next tooth 11d, so that a succession of audible clicks can be heard as the strap portion passes downwardly. However, due to the shape of tooth 13 and the shape of recesses 11c in each strap, the tooth 13 will jam in a recess 11c and effectively prevent upward motion of the strap, unless extreme upward forces are applied to the strap. In FIG. 5b strap 11 has been pulled downwardly through a slot 12 in bar 10 so that several of its teeth 11d lie below tooth 13. A downward pull on the strap would allow further downward motion of the strap, but upward movement of the strap is prevented because tooth 13 cannot bend appreciably upwardly.

It can be seen in FIG. 5b that tooth 13 could bend upwardly if the tooth 11d immediately below it merely engaged a small portion of tooth 13 near its tip. However, this is prevented by the cooperating surfaces on the strap tooth and the bar slot tooth, both of which extend at an angle to the slot direction, or strap feeding direction. As upper surface 16 on the strap tooth in FIG. 5b engages the lower surface 13b of tooth 13, it will be seen that these engaging surfaces move the tooth 13 further into the recess between a pair of strap teeth, and further that the strap 11 is pulled toward the side of the slot carrying tooth 13. Furthermore, because of the thickness (dimension $f$ in FIG. 5b) of the strap relative to the width of slot 12, surfaces 11e and 11f, or the similar surfaces on the other side of the strap, will bear against the side of the slot 12 opposite tooth 13 and prevent the strap teeth from merely engaging the narrow and flexible tip edge of tooth 13. Thus the teeth on the bar and the strap and the recesses 11c will be seen to function as cooperating ratchet locking means on each bar and strap. As will be shown below, various other forms of ratcheting locking means may be utilized without departing from the invention.

As illustrated in FIGS. 3 and 5a, a section of each strap 11 just below its head 11a does not contain any teeth 11d. This prevents each strap from locking against reverse movement relative to the bar on which its respective head 11a seats, but allows the lower tooth portion of that strap to lock against reverse movement relative to any further bars 10 through which the strap passes. Since no teeth are provided on the strap above a level indicated by dashed line 18 in FIG. 5a, it will be seen that the entire strap thereshown can be readily removed by cutting through it at line 18, after which the strap portion below line 18 can be pulled downwardly, and the upper portion including the strap head 11a may be lifted upwardly.

Figure 6:
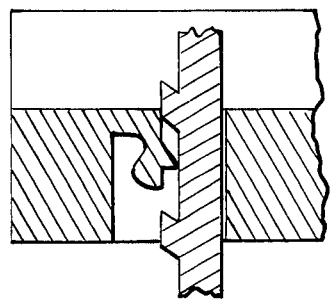
FIGS. 6 and 7 are cross-section views similar to FIG. 5b illustrating modified form of cooperating ratchet-type locking means used on the bars and straps of the invention.
Figure 7:
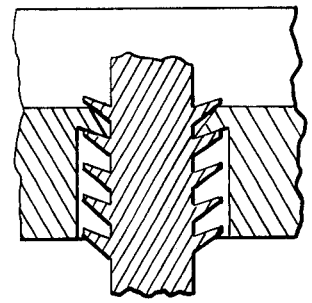

While the strap of FIGS. 3, 4, 5a and 5b is shown provided with teeth 11d on both of its sides, it will be noted that the teeth on one side perform no function once the strap has been inserted through a bar of the type shown in FIGS. 2a–2c, 5a and 5b. Nevertheless I prefer that teeth be provided on both sides of the strap even for use with such bars, since the installer then is not required to orient the strap. However, it is within the scope of the invention to provide straps having teeth on a single side, such as the strap partially shown in cross-section in FIG. 6. Also, it is within the scope of the invention to provide bars having pairs of flexible teeth arranged on opposite sides of each of their slots in the manner shown in FIG. 7.

In order to assemble a cable group of the type shown in FIG. 1, the four straps 11 are extended through respective slots 12 in the uppermost bar 10 until the heads of the straps seat in the channel recess of that bar. The bar is then laid atop the three uppermost cables, the straps 11 are positioned to extend downwardly on respective sides of the cables, and then the lower ends of the straps are fed downwardly through slots 12 in the next lower bar 10. That bar then may be pushed upwardly against the upper row of cables, and each strap 11 pulled downwardly, till the uppermost row of cables is tightly clamped between the two uppermost bars. Then the straps may be positioned between the second row of cables, and the next lower bar installed in similar fashion, and so forth. Thus successive rows of cables are clamped by the straps between successive pairs of bars 10, preventing any cable in a given row from moving vertically relative to other cables in that row, and a taut section of strap prevents any cable from moving horizontally relative to any of the other cables. When a group of cables are laced or stitched together using the prior art technique, it sometimes becomes difficult to maintain a group of cables intended to lie together in a row so aligned in a row, since squeezing them together sometimes causes one or several to "pop" upwardly or downwardly, but it will be seen that this problem is completely overcome by the present invention. The straps 11 are also preferably formed in standard lengths, such as 12 or 16 inch lengths, for example, and after the straps are installed, their ends ordinarily will extend some distance below the lowermost bar 10. The ends of the straps below the lowermost bar may be cut off to provide a neater appearance, if desired. In FIG. 5b the lower end of the strap thereshown is assumed to have been cut off in such a fashion. The straps may be easily cut using either a sharp knife, a pair of wire-cutter pliers, or a like tool.

It is by no means necessary that the strap heads be mounted at the top of an assembly like that of FIG. 1. By inverting each of the bars, it will be apparent that the heads of the straps could instead be arranged to seat in the lowermost bar 10, and to extend upwardly through the other bars and lockingly engage them. Further, it now will be apparent that the bars 10 can be arranged to extend vertically, with the straps 11 extending horizontally.

As well as clamping the group of cables in FIG. 1 together, it is ordinarily necessary that they be fastened to supporting structure, such as a bar, pipe, bracket or the like. An added feature of the invention is that a cable assembly clamped together in the manner shown in FIG. 1 can be readily clamped to other supporting structure. In FIG. 1 a strap 15 passes underneath the upper bar 10, and its upper ends may be tied around a pipe, bracket or the like (not shown). It will be apparent that straps may be readily routed in similar fashion around any edge of the assembly of FIG. 1 to be attached to supporting structure. Holes may be drilled through any of bars 10 to bolt them to supporting structure.

Should it become necessary or desirable to re-route one of the cables in FIG. 1 which lies in either the left-side or right-side column, it will be seen merely to be necessary to cut the strap adjacent that cable and then pull the cable horizontally from between the bars which lie above and below it. For example, the middle cable in the left-side column could be removed after the left-most strap is cut at the point labelled X, and if desired, a different cable could be inserted in its place. It is important to note that when the strap is cut and one cable is removed, none of the other cables move from the matrix configuration, nor move relative to the support (not shown) to which the assembly is fastened. Thus substituting individual cables in the outside columns of the matrix is simply and rapidly performed. The lower piece of the cut strap ceases to carry weight, and it can be pulled downwardly through the lower bars, but the other straps maintain the bars in their respective positions. In some installations it will be deemed adequate to merely insert a new strap in place of the removed lower piece of the original strap, with the head of the new strap engaging the bar below point X, leaving the top portion of the original strap in place. Alternatively one can provide a new strap along the entire side of the assembly. To insert a new strap at the left side of the assembly, the top portion of the cut strap must be removed, of course. By merely cutting the left-side strap at Y, all of the strap below point Y may be pulled downwardly for removal, the strap head may be lifted up, and then a new strap may be inserted.

Figure 8:
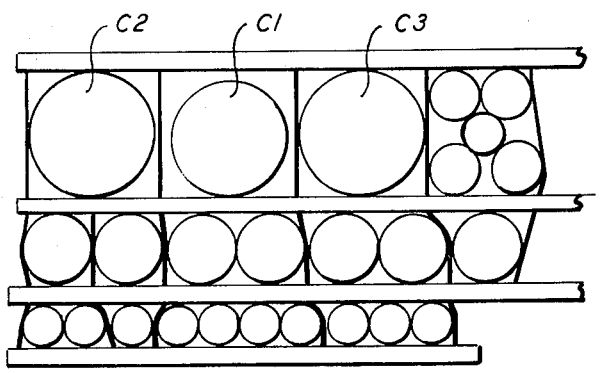
FIG. 8 is a cross-section elevation view diagrammatically illustrating a group of cables clamped in accordance with the present invention.

In very many applications for which the invention is intended, a group of cables to be supported and clamped will include cables having a variety of different diameters. FIG. 8 illustrates the versatility of the invention in such applications. In FIG. 8 each cable is shown for sake of drafting convenience, having a perfectly circular cross section, but it is important to recognize that as the straps are tightened, the bars tend to slightly deform portions of the cable to roughly oval or elliptical cross sections. Thus while the cable shown at C1 is shown only contacting one bar and neither of the straps which extend past its sides, in practice the cables C2 and C3 will tend to spread sidewise due to pressure which the bars apply to them, and the sidewise spread will force straps against cable C1. Because the straps are flexible and similar to each other, there is a tendency for their tensions to equalize, and for the cables to deform and the straps to deflect so that all of the cables will be tightly clamped. Furthermore, while bars 10 have been termed rigid, and they may be formed of substantially rigid plastic, a measure of flexibility in bars 10 is preferred, since slight deflections in the bars 10 advantageously tend to equalize tensions in the straps and forces applied to the cables. When a group of cables of varying sizes are bound with cord or twine in the prior art manner, a large number of knots must be tied so that movement of one cable cannot loosen many others in the same pack. With the present invention tedious knot-tying is wholly eliminated. While one cannot conveniently tighten portions of a cord-bound bundle after it has been laced, any of the straps in FIG. 8 can be further tightened to any desired extent after all the cables are in place.

FIG. 8 also illustrates that the flexible straps used in a given assembly need not extend strictly parallel to each other throughout their entire lengths, that a given row or column of cables may contain different diameter cables, that one or several cables may pass between an adjacent pair of straps or an adjacent pair of bars, and that in a given assembly it is not always necessary that all straps extend to or originate from the same combination of bars.

Figure 9:
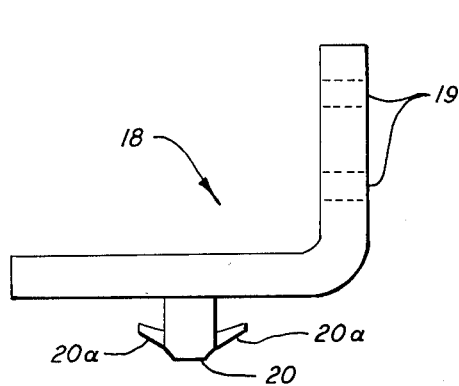
FIG. 9 illustrates a hanger assembly which may be used with the present invention.

Rather than securing a bound cable assembly to supporting rack structure by use of a cord or a prior art tie-wrap device, it is often convenient to use an accessory clip of the type shown in FIG. 9. The clip 18 comprises a metal or plastic angle clip having one or more holes, such as those shown at 19 to facilitate bolting of the clip to any desired frame, and a rigid stud 20 having flanges 20a which function in somewhat the same fashion as the strap teeth. Stud 20 may be forced through any unused slot in a bar 10 until the teeth 13 of that slot are trapped between the lower face of the clip and the flanges on the stud.

Figure 10:
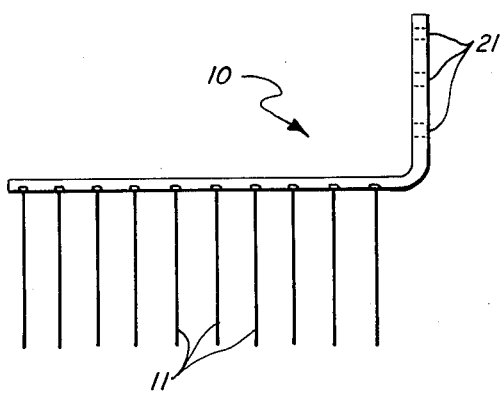
FIG. 10 is a side view of a modified bar having a plurality of attached straps.

FIG. 10 illustrates a modified form of bar 10' which may be used as a top bar, bottom bar or side bar, together with one or more bars 10 of the type shown in FIGS. 1 and 2a–2c. Bar 10' may be formed of metal or rigid plastic, and is provided with fastening means shown as comprising holes 21, which allow bar 10' to be fastened to a pipe or other support. Bar 10' is provided with a plurality of slots through which a plurality of straps 11 extend, the slots 12 preferably comprising slots of the type shown in FIGS. 2a–2c. The straps 11 may be installed in bar 10' at a factory, eliminating any need for an installer to perform this function in the field, and eliminating any need for separate stocking of bars and straps. Because of the ratchet locking means utilized, none of the straps can be lost during shipping and handling prior to installation. When the bar 10' is installed, any of the straps not required for a given cable installation may be cut off. In FIG. 10 a plurality of slots may be provided in between the heads of the straps, and those slots may contain locking means, either of the integral or molded-in type shown in FIG. 2b, or of the insertable type shown in FIG. 11b, with each such locking means arranged to allow upward (in FIG. 10) but not downward passage of a strap 11. The device of FIG. 10 then can conveniently be used to suspend single rows of cables. Various of the straps can be looped under respective cables and then passed upwardly through the bar to lock those cables, while others of the straps can pass downwardly to lower bars in the manner of the straps in FIGS. 1 and 8.

It is important to note in connection with FIG. 1, for example, that the cables can be retained in the arrangement thereshown even if teeth 13 were not provided in the slots in the three upper bars 10, but only in the lowermost bar. If teeth 13 are provided only in the slots of the lowermost bar, so that the straps can slidingly pass in either direction through the slots of the intermediate bars, it will be seen that the intermediate bars will move so that forces on all the cables in a given column tend to equalize. Tie-wrap straps which are presently available commercially have widened heads with through passages containing ratcheting locking means, and straps of that type may be used with the bars of the present invention, with the head-contained locking means remaining unused.

Figure 11A:
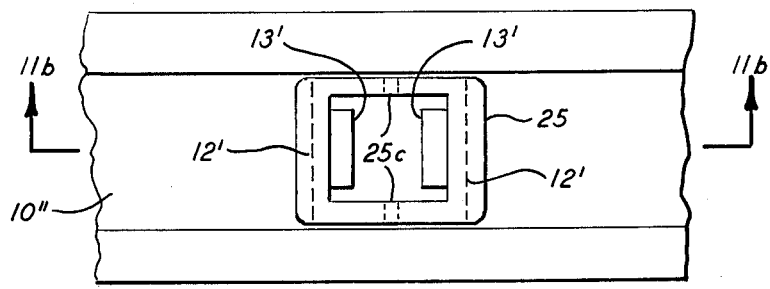
FIG. 11a is a plan view of a modified form of bar and an insertable locking means.
Figure 11B:
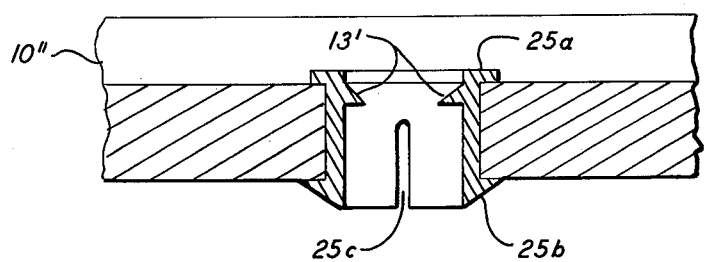
Figure 11C:
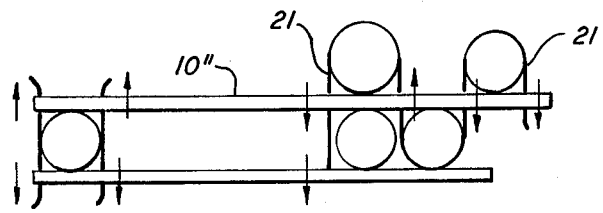
FIG. 11c is a cross-section view of a group of cables useful in understanding the versatility of the invention.
Figure 11D:
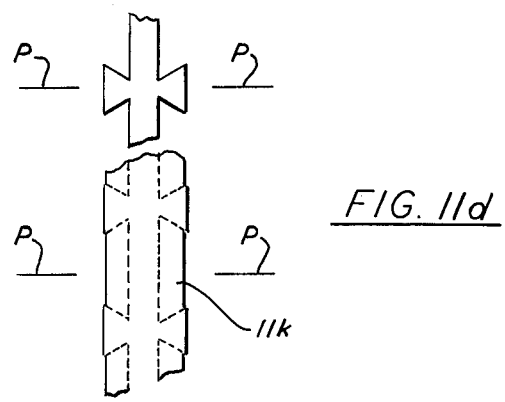
FIG. 11d is a cross-section view of one form of plastic strap which may be used with the insertable locking means shown in FIGS. 11a and 11b.

A modified form of bar shown in FIGS. 11a and 11b contains a plurality of spaced rectangular slots, only one of which is shown, with two of its edges indicated in phantom at 12' in FIG. 11a. That slot is shown fitted with a tooth-carrying insert member 25. The insert is shown as comprising a generally ring-shaped plastic body having an outer periphery conforming to the shape of slot 12', an upper flange 25a which seats against the top of the web of the bar 10", and a tapered lower flange 25b which seats against the lower surface of the web. A pair of teeth 13' are shown extending inwardly, and it will become apparent that the teeth may cooperate with cooperating teeth and recesses on flexible straps, one of the types shown in FIG. 11d, to provide ratcheting locking of the straps. FIG. 11d illustrates two basically similar forms of strapping, differing only in that the recesses 11k do not extend all the way across the strapping shown in the lower part of the Figure. Wider teeth 13' may be used in the insertable members 25, of course, if strapping such as that shown at the top of FIG. 11d is used, but the teeth on such strapping tend to be more flexible. Either type of headless strapping is emminently usable, however. Insert member 25 further includes a pair of slits 25c, which allow the lower flange to be compressed temporarily inwardly so that it may pass downwardly through the slot 12', and then snap outwardly to lock the insert member into the slot 12'. Thus it will be apparent that insert members may be readily snapped into selected slots carried in bar 10", while other slots in the bar may be left without inserts, either because they are not required to accommodate a strap in a given installation, or so that a strap can slide freely through them should it be desired to equalize tension, for example. It may be noted that insert 25 can readily be inserted in the opposite direction through slot 12', so that its teeth then would prevent downward (in FIG. 11b) movement of a strap but allow upward movement. This provides for great versatility, and allows use of strap material supplied in continuous form from a reel, since the strap material need not be formed with heads such as head 11a in FIG. 5a. Use of such strap by merely cutting pieces of desired length from a reel will be seen to greatly decrease waste. In FIG. 11c a length of strap 21 is shown used to clamp three cables to a bar 10" using inserts of the type shown in FIGS. 11a and 11b. An arrow adjacent each passage of strap 21 through a slot in bar 10" indicates the way in which the strap can pass through a respective slot, and this is determined, of course, by the direction in which a respective insert 25 has been inserted in the slot. It will be seen that the right end of strap 21 may be anchored in bar 10" even though the strap has no head portion by merely pushing it downwardly through the insert 25 located at the right end of the bar. At the left side of FIG. 11c several short pieces of ratcheting strap clamp a cable between two bars 10", the ends of the pieces being shown elongated merely to indicate that they are separate pieces. The bars shown in FIGS. 11a–11c can be readily formed from metal rather than plastic, if desired, and it will be apparent that they can be very economically produced by merely punching slots in the web of readily available aluminum channel stock, for example. It will be noted that while the strap of FIGS. 3 and 4 only can pass in one direction through a slot 12 that it has no perpendicular plane of symmetry, and that it can resist tension in only one direction, the headless strapping of FIGS. 11c and 11d has perpendicular planes of symmetry, indicated by lines P—P for example in FIG. 11d. Thus when either form of the strapping shown in FIG. 11d is used with an insertable locking means, as in the manner shown in FIG. 11c, the respective directions in which strap movement are allowed or prevented is determined solely by the direction in which the insertable locking means is installed in one of the bars 10", and not by any characteristic of the strapping. Thus the forms of strapping shown in FIG. 11d can resist tension in either direction, as is necessary in FIG. 11c.

It will become apparent as a result of the above disclosure, that bar members similar to bars 10 may be provided with teeth molded therein, with the teeth in alternate slots or apertures 12 arranged in opposite directions, so that the techniques explained in connection with FIG. 11c can be practiced, if desired, without the use of separate, insertable locking means in the bars.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. Clamping apparatus for clamping together a plurality of elongated articles extending generally parallel to each other, said articles being arranged in rows and columns, said apparatus comprising, in combination: a plurality of separate substantially rigid bar members extending parallel to and spaced apart from each other, with each of said rows of said articles being situated between adjacent pairs of said bar members; and a plurality of separate flexible straps inserted through and extending between said bar members, at least one of said bar members including a plurality of ratcheting locking means engaging respective cooperating locking means on said straps to maintain tension in said straps and maintain each row of said articles clampingly engaged by and between a respective pair of said bar members, said apparatus being unsupported except by said articles.

2. Apparatus according to claim 1 wherein each of said bar members includes a plurality of slots spaced apart along its length, each of said straps extending through a respective slot in each of said bar members.

3. Apparatus according to claim 1 wherein said one of said bar members includes a plurality of slots and said plurality of ratcheting locking means on said bar member comprise a plurality of resiliently deformable insert means adapted to lock in respective ones of said slots, each of said insert means having a through passage and tooth means extending within said through passage to prevent movement in one direction of a strap through said passage.

4. Apparatus according to claim 1 wherein each of said columns of said articles is situated between a respective adjacent pair of said straps.

5. Apparatus according to claim 2 wherein each of said locking means on said one of said bar members comprises tooth means situated in a respective one of said slots, and each of said cooperating locking means on said straps comprises a plurality of recesses spaced along each of said straps, said teeth cooperating with said recesses to prevent said straps from being moved in one direction through said slots.

6. Apparatus according to claim 2 wherein each of said straps includes a widened head portion adapted to seat on one of said bar members adjacent a respective slot of said one of said bar members.

7. Apparatus according to claim 2 wherein said one of said bar members is formed of molded plastic and said ratcheting locking means comprises tooth means formed adjacent to and extending into each of slots to partially occlude each of said slots.

8. Apparatus according to claim 2 wherein each of said ratcheting locking means on said one of said bar members comprises tooth means extending into a respective slot in said one of said bar members.

9. Apparatus according to claim 6 wherein each of said straps has a plurality of teeth spaced along a first portion of its length and a second portion between said head portion and said first portion which is slidable through said slots in both directions.

10. Apparatus according to claim 1 wherein each of said bar members has a pair of substantially straight parallel edges extending along its length against which said articles are clamped.

11. Apparatus according to claim 1 wherein at least one of said bar members is channel-shaped in cross-section and has a pair of flanges engaging a row of said articles on one side of said one of said bar members.

12. Apparatus according to claim 1 wherein each of said flexible straps has a head portion widened to limit insertion of its respective strap through said bar members, said head portions of said straps being spaced apart from each other along one of said bar members.

13. Apparatus according to claim 1 wherein at least one of said flexible straps extends through a plurality of said ratcheting locking means on a plurality of said bar members.

14. The method of binding a plurality of electrical cables in rows and columns which comprises the steps of: inserting an unsupported rigid bar on each side of each row of said cables with said bars extending substantially parallel to each other in a first direction; passing a plurality of separate straps through openings spaced along said bars in a second direction generally perpendicular to said first direction, said openings in at least the last of said bars through which said straps are passed having ratcheting locking means preventing removal of said straps therefrom; and tightening said straps to compress said cables between said bars.

15. The method of claim 14 wherein said step of passing said straps includes threading a plurality of said straps between selected cables of each of said rows of said cables.

16. In a cable assembly having a plurality of flexible cables suspended between a pair of spaced apart fixed support means, a plurality of clamping assemblies spaced apart from each other along said cables between said fixed support means, each of said clamping assemblies being unsupported except by said cables and comprising a plurality of separate substantially rigid bar members extending parallel to and spaced apart from each other, said cables being arranged in rows and each of said rows of cables being situated between adjacent pairs of said bar members, and a plurality of separate flexible straps inserted through and extending between said bar members, at least one of said bar members including a plurality of ratcheting locking means adapted to engage respective cooperating locking means on said straps to maintain each row of said cables pressed between a respective pair of said bar members.

17. A cable assembly according to claim 16 having a further one of said clamping assemblies affixed to said cables at one of said fixed support means, and means for affixing one of said bar members of said further one of said clamping assemblies to said one of said fixed support means.

* * * * *